(12) United States Patent
Pomish et al.

(10) Patent No.: US 11,166,134 B2
(45) Date of Patent: Nov. 2, 2021

(54) VEHICULAR COMMUNICATIONS BASED ON INTERNET COMMUNICATION IDENTIFIERS ASSOCIATED WITH CODES OF VEHICLES

(71) Applicant: Toyota Motor Engineering & Manufacturing North America, Inc., Erlanger, KY (US)

(72) Inventors: Ethan Pomish, Livonia, MI (US); Danil Prokhorov, Canton, MI (US)

(73) Assignee: TOYOTA MOTOR ENGINEERING AND MANUFACTURING NORTH AMERICA, INC., Plano, TX (US)

( * ) Notice: Subject to any disclaimer, the term of this patent is extended or adjusted under 35 U.S.C. 154(b) by 46 days.

(21) Appl. No.: 16/664,045

(22) Filed: Oct. 25, 2019

(65) Prior Publication Data

US 2021/0127242 A1    Apr. 29, 2021

(51) Int. Cl.
| | | |
|---|---|---|
| *H04W 4/00* | (2018.01) | |
| *H04W 4/46* | (2018.01) | |
| *G06K 7/14* | (2006.01) | |
| *H04L 1/18* | (2006.01) | |

(52) U.S. Cl.
CPC ............ *H04W 4/46* (2018.02); *G06K 7/1413* (2013.01); *G06K 7/1417* (2013.01); *H04L 1/18* (2013.01)

(58) Field of Classification Search
CPC ......... H04W 4/46; H04W 4/023; H04W 4/40; H04W 4/412; H04W 4/80; G06K 7/1413; G06K 7/1417; G06K 9/00825
See application file for complete search history.

(56) References Cited

U.S. PATENT DOCUMENTS

| | | | |
|---|---|---|---|
| 7,990,283 B2 | 8/2011 | Breed | |
| 8,572,375 B2 | 10/2013 | Bishop et al. | |
| 9,773,411 B2 | 9/2017 | Popple | |
| 9,805,519 B2 | 10/2017 | Ramanujam | |
| 10,755,491 B2* | 8/2020 | Lee | H04W 4/12 |
| 2017/0164178 A1 | 6/2017 | Anjum et al. | |
| 2017/0213462 A1* | 7/2017 | Prokhorov | G08G 1/0965 |
| 2018/0184245 A1* | 6/2018 | Park | H04W 4/023 |
| 2018/0217610 A1* | 8/2018 | Schuh | G05D 1/0257 |
| 2019/0065945 A1* | 2/2019 | Luo | G06N 3/08 |
| 2019/0382004 A1* | 12/2019 | Golov | G06K 9/00825 |
| 2020/0265716 A1* | 8/2020 | Ibrahim | H04W 4/023 |

FOREIGN PATENT DOCUMENTS

| | | |
|---|---|---|
| KR | 101481738 B1 | 1/2015 |
| WO | 1998038761 A2 | 9/1998 |

\* cited by examiner

*Primary Examiner* — Abdelnabi O Musa
(74) *Attorney, Agent, or Firm* — Jordan IP Law, LLC (57) ABSTRACT

Apparatuses, systems, and methods to identify a first communication transmitted based on a first communication identifier that identifies a first vehicle. The first communication originates from a second vehicle that includes a code associated with a second communication identifier that identifies the second vehicle. The technology identifies based on the first communication, a third communication identifier that identifies a third vehicle. The technology causes a second communication to be transmitted based on the third communication identifier.

20 Claims, 7 Drawing Sheets

VEHICULAR COMMUNICATIONS BASED ON INTERNET COMMUNICATION IDENTIFIERS ASSOCIATED WITH CODES OF VEHICLES

TECHNICAL FIELD

Embodiments generally relate to vehicular communications. More particularly, embodiments relate to vehicle communications through identifiers (that are associated with codes) and communication based on the identifiers.

BACKGROUND

Vehicular communications may be used to communicate various types of information. While vehicular communications are useful in many ways, the utility of such vehicular communications may be hampered due to latency and the amount of information that may be conveyed. For example, a vehicle may analyze the brake lights of surrounding vehicles through image recognition techniques to determine when the vehicles are braking. Doing so however incurs latency in that such a process in multi-staged. For example, a vehicle may initiate a brake process (e.g., depress brake pedal), then the brake light may illuminate, another vehicle may register the illumination through image recognition techniques, analyze the illumination, determine that the vehicle is braking and react accordingly. Moreover, such a multi-staged process may be prone to error at each stage.

Moreover, such systems are limited in their communication radius. For example, if vehicles are visually and/or auditorily separated from each other, then the vehicles may be unable to effectively communicate as indicated above. Furthermore, such a system is reactively driven which limits the amount and types of data that may be transmitted. Moreover, such vehicular communications may be driven through communications that occur as an action occurs, rather than communications that occur before such an action occurs. Such a system is prone to error, leaves minimal time for adjustments and is inefficient.

BRIEF SUMMARY

Some embodiments include a first vehicle associated with a first communication identifier. The first vehicle includes one or more sensors that generate sensor data associated with a second vehicle, where the second vehicle includes a second code associated with a second communication identifier that identifies the second vehicle, the second code being different from a first code associated with the first communication identifier of the first vehicle. The first vehicle further includes a network interface that receives a first communication, where the first communication is transmitted based on the first communication identifier and originates from the second vehicle. The first vehicle further includes a control system including at least one processor and at least one memory having a set of instructions, which when executed by the at least one processor, cause the control system to identify based on the first communication, a third communication identifier that identifies a third vehicle, and cause a second communication to be transmitted based on the third communication identifier.

Some embodiments include at least one computer readable storage medium comprising a set of instructions, which when executed by a control system of a first vehicle, cause the control system to identify a first communication transmitted based on a first communication identifier that is associated with the first vehicle, where the first communication originates from a second vehicle that includes a code associated with a second communication identifier that identifies the second vehicle, identify based on the first communication, a third communication identifier that identifies a third vehicle, and cause a second communication to be transmitted based on the third communication identifier.

Some embodiments include a method of communication associated with a first vehicle, the method including identifying a first communication transmitted based on a first communication identifier that identifies the first vehicle, where the first communication originates from a second vehicle that includes a code associated with a second communication identifier that identifies the second vehicle, identifying based on the first communication, a third communication identifier that identifies a third vehicle, and causing a second communication to be transmitted based on the third communication identifier.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
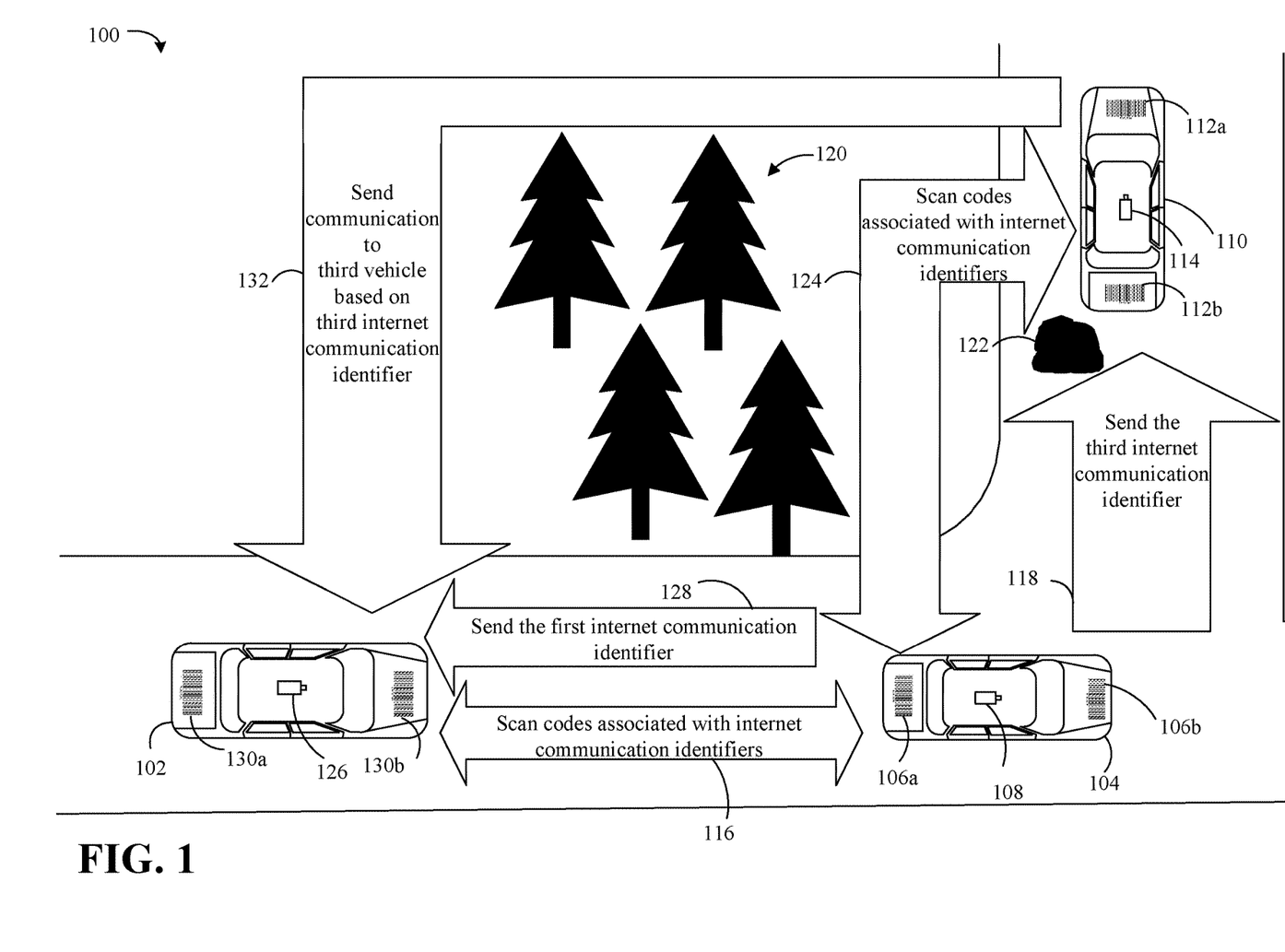
FIG. 1 is a diagram of an example of a vehicle communication scenario according to an embodiment.

Turning now to FIG. 1, an enhanced vehicle communication process 100 is shown in which a first vehicle 110, a second vehicle 104 and a third vehicle 102 are travelling along a same roadway. The second vehicle 104 may be travelling ahead of the third vehicle 102 and behind the first vehicle 110. As is illustrated, the second vehicle 104 may provide an internet communication identifier (e.g., a third internet communication identifier) to the first vehicle 110 so that the first vehicle 110 is able to communicate with the third vehicle 102 even though the first vehicle 110 is unable to visually and/or auditorily identify and/or be aware of a presence of the third vehicle 102. As will be explained in further detail below, doing so allows for streamlined communication between different vehicles, such as the first vehicle 110 and the third vehicle 102 despite being separated and otherwise unaware of each other. Thus, power may be saved by direct communications between the first vehicle 110 and the third vehicle 102 as opposed to broadcasts. Further, a wide variety of relevant and directed information may be shared between the first vehicle 110 and the third vehicle 102. For example, information which may be relevant for the third vehicle 102 but not the second vehicle 104 may transmitted directly to the third vehicle 102 and not the second vehicle 104. As will be described herein, the terms transmission and communication may be used interchangeably. Furthermore, while internet communications are discussed below, other types of communications may be utilized, such as Bluetooth communications.

In detail, the process 100 may include scanning one or more codes 112a, 112b, 106a, 106b, 130a, 130b. For example, the process 100 may include scanning the codes 106a, 112b that are associated with internet communication identifiers 124. For example, the first vehicle 110 may scan, with a sensor 114 (e.g., imaging device, LIDAR sensor, etc.), a code 106a of the second vehicle 104. The code 106a may correspond to an internet communication identifier to communicate with the second vehicle 104. For example, the internet communication identifier may include a unique Internet Protocol (IP) address to communicate with the second vehicle 104. In further detail, data packets may be addressed to the IP address of the second vehicle 104 to communicate with an occupant of the second vehicle 104 and/or the second vehicle 104. In some embodiments, the first vehicle 110 may scan the code 106a and decode the code 106a to identify the internet communication identifier of the second vehicle 104. In some embodiments, the first vehicle 110 may scan the code 106a, identify an online storage that stores the internet communication identifier of the second vehicle 104 and retrieve the internet communication identifier of the second vehicle 104 from the online storage. In some embodiments, the internet communication identifier is translated by a computing device into an appropriate mechanism (e.g., IP address) to communicate with the first vehicle 110.

Scanning codes 106a, 112b associated with internet communication identifiers 124 may further include the second vehicle 104 utilizing sensor 108 to scan a code 112b of the first vehicle 110, identify the internet communication identifier (e.g., an IP address) of the first vehicle 110 and provide targeted transmissions to the first vehicle 110.

Similarly, the process 100 may include scanning codes 130b, 106a associated with internet communication identifiers 116 of the second and third vehicles 102, 104. In detail, the third vehicle 102 may utilize sensor 126 to scan code 106a of the second vehicle 104 to identify an internet communication identifier to be used to communicate with the second vehicle 104. Further, the second vehicle 104 may utilize sensor 108 to scan code 130b of the first vehicle 110 to identify an internet communication identifier to be used to communicate with the first vehicle 110.

The first vehicle 110 may be unable to scan the codes 130a, 130b of the third vehicle 102. For example, the sensor 114 of the first vehicle 110 may be unable to accurately identify the codes 130a, 130b because trees 120 occlude the codes 130a, 130b from the sensor 114. Thus, the first vehicle 110 may be unaware of the third vehicle 102 due to the trees 120 preventing the first vehicle 110 from sensing the third vehicle 102.

As already discussed, the second vehicle 104 may be aware of both the first and third vehicles 110, 102 and the respective internet communication identifiers. The second vehicle 104 may therefore function as an intermediary to relay data between the first and third vehicles 110, 102.

For example, and as described above, the second vehicle 104 scanned the first and third vehicles 110, 102, and is thus made aware of the first and third vehicles 110, 102. The second vehicle 104 may send (e.g., a communication that is wireless and internet based) the internet communication identifier (which may be referred to as the third internet communication identifier) of the third vehicle 102 to first vehicle 110 via transmission/communication 118. The second vehicle 104 may send (e.g., a communication that is wireless and internet based) the internet communication identifier (which may be referred to as the first internet communication identifier) of the first vehicle 110 to the third vehicle 102 via transmission/communication 128.

Thus, the first and third vehicles 110, 102 may initially be unaware of each other. The second vehicle 104 may send a transmission to the first vehicle 110 informing the first vehicle 110 of the presence of the third vehicle 102, and the third internet communication identifier of the third vehicle 102. The transmission may include other identifying features of the third vehicle 102, such as an approximate distance(s) of the third vehicle 102 from the second vehicle 104 and/or the first vehicle 110, driving parameters (e.g., a velocity, acceleration, etc.) of the third vehicle 102, a position (e.g., lane on the roadway) of the third vehicle 102. Therefore, the second vehicle 104 may make the first vehicle 110 aware of the third vehicle 102 and the third internet communication identifier.

The second vehicle 104 may send a transmission 128 to the third vehicle 102 informing third vehicle 102 of the presence of the first vehicle 110 and the first internet communication identifier of the first vehicle 110. The transmission 128 may include other identifying features of the first vehicle 110, such as an approximate distance(s) of the first vehicle 110 from the second vehicle 104 and/or the third vehicle 102, driving parameters (e.g., a velocity, acceleration, whether a blinker is on, etc.) of the first vehicle 110, a position (e.g., lane on the roadway) of the first vehicle 110. Therefore, the second vehicle 104 may make the third vehicle 102 aware of the first vehicle 110 and the first internet communication identifier of the first vehicle 110.

The first vehicle 110 may then send a communication/transmission 132 to the third vehicle 102 based on the received third internet communication identifier that is received from the second vehicle 104. The communication 132 to the third vehicle 102 may include an identification of other cars, obstacles, road conditions (e.g., slippery, wet, dry, brightness, etc.), Cooperative Adaptive Cruise Control parameters (e.g., a heading, a speed, global positioning system coordinates, connections and/or codes of surrounding vehicles) of the first vehicle 110, other driving conditions and/or any other relevant information. Thus, communication between the first and third vehicles 110, 102 may be established.

In the illustrated example, the first vehicle 110 may have passed a rock 122 (e.g., an obstacle) on the roadway. A driver of third vehicle 102 and the third vehicle 102 may be unaware of the rock 122 as the trees 120 occlude the rock 122 from the third vehicle 102 and the driver. The communication from the first vehicle 110 to the third vehicle 102 may include data associated with the rock 122, such as a size of the rock 122, an approximate position (e.g., global positioning system coordinate) of the rock 122, a size of the rock 122, a position of the rock 122 relative to the roadway (e.g., on the left side of the roadway, right side of the roadway, middle of the roadway, off the roadway but proximate enough to roadway to be of concern, etc.).

The vehicle 110 may also provide guidance on how to avoid or mitigate unsafe driving conditions (e.g., obstacles, unsafe portions of the road, etc.). For example, the first vehicle 110 may send in the communication 132 that the rock 122 is on the left side of the roadway, and therefore that the third vehicle 102 should remain on the right side of the roadway. Further, the communication may include a suggestion that the third vehicle 102 set a velocity of the third vehicle 102 to be under a certain value to provide sufficient time to maneuver the third vehicle 102 after the third vehicle 102 takes a left turn.

In the example illustrated in FIG. 1, it may be unnecessary for the first vehicle 110 to send the communication to the second vehicle 104. For example, the second vehicle 104 may be exiting the roadway (e.g., proceeding straight instead of turning), and therefore the communication may be irrelevant to the second vehicle 104. As such, the first vehicle 110 may avoid sending the communication to the second vehicle 104, and only sends the communication to the third vehicle 102. In some embodiments, the second vehicle 104 may notify the first vehicle 110 that the second vehicle 104 will exit the roadway, and/or the first vehicle 110 may identify from a travel pattern of the second vehicle 104 that the second vehicle 104 will proceed straight to exit the roadway. For example, the first vehicle 110 may include sensors (e.g., image recognition sensors) and processing to identify that the second vehicle 104 is travelling straight (not turning) and is above a threshold speed to make a safe turn. Therefore, the first vehicle 110 may determine that the second vehicle 104 will proceed straight to exit the roadway.

In some embodiments, the first vehicle 110 may prepare data for the third vehicle 102 and identify whether the data is relevant for both the second and third vehicles 104, 102. If so, the data may be transmitted to both the second and third vehicles 104, 102. For example, if the data has already been transmitted to the second vehicle 104, the data may not be retransmitted to the second vehicle 104. If, however the data has not been transmitted to the second vehicle 104, the first vehicle 110 may transmit the data to both the second and third vehicles 104, 102.

In some embodiments, the third vehicle 102 may send a transmission (not shown) to the first vehicle 110 in response to the communication 132 of the first internet communication identifier of the first vehicle 110 from the first vehicle 110. The communication may include an acknowledgement of the communication from the third vehicle 102 so that the first vehicle 110 may avoid retransmission of the communication. In some embodiments, if the first vehicle 110 does not receive an acknowledgement from the third vehicle 102, the first vehicle 110 may retransmit the communication with updated data if needed (e.g., updated position of the first vehicle 110).

In some embodiments, the third vehicle 102 may send a transmission (not shown) to the first vehicle 110 before the first vehicle 110 sends any transmission to the third vehicle 102. The transmission may include a request for specific data (e.g., hazardous condition notifications, velocity control adjustments, etc.). In response, the first vehicle 110 may send the communication to the third vehicle 102 based on the internet communication identifier received during communication 132, to include at least part of the requested specific data. In some embodiments, the transmission that the third vehicle 102 sends to the first vehicle 110 may include data associated with the third vehicle 102, such as future driving directions, velocity, acceleration, etc. In doing so, the first vehicle 110 may be able to specifically identify relevant data to provide to the third vehicle 102. For example, if first vehicle 110 determines that the third vehicle 102 will exit the roadway before reaching rock 122, the first vehicle 110 may avoid communicating to the third vehicle data associated with the rock 122. In this example however, the third vehicle 102 does not exit the roadway and thus the communication to the third vehicle 102 may include data associated with the rock 122.

In some embodiments the second vehicle 104 may periodically send or be triggered to send the third internet communication identifier to the first vehicle 110 via transmission/communication 118. For example, the second vehicle 104 may periodically provide internet communication identifiers of all vehicles surrounding the second vehicle 104. In some embodiments, the second vehicle 104 may update surrounding vehicles, including the first vehicle 110, when the second vehicle 104 identifies a new and previously undetected vehicle such as the third vehicle 102. Thus, the process 100 may be triggered or periodically executed as described above.

In some embodiments, the third vehicle 102 may utilize the data received from the communication 132 from the first vehicle 110 in a collaborative adaptive cruise control system. For example, the communication 132 may include collaborative adaptive cruise control data including velocity, acceleration, braking of the first vehicle 110 and/or of vehicles surrounding the first vehicle 110. Based on the collaborative adaptive cruise control data, the third vehicle 102 may adjust one or more driving parameters, such as velocity, acceleration, braking and/or future navigation directions.

The codes 106a, 106b, 112a, 112b, 130a, 130b may be any unique code, such as a barcode (e.g., a 3D barcode, 2D barcode, 1D barcode, circular bar code, LIDAR bar code, RFID bar code, etc.), quick response (QR) code or other unique code. Further, the first, second and third vehicles 110, 104, 102 may communicate with each other through wireless mediums and the internet.

As such, process 100 may provide an enhanced process to allow for vehicle communications with reduced latency and enhanced efficiency to form a collaborative driving scenario in which communication between vehicles is facilitated. Moreover, process 100 may include direct transmission of messages between first, second and third vehicles 110, 104, 102 to reduce broadcast signals, reduce latency of broadcast communications and reduce potential noise interference. For example, if each vehicle in a plurality of vehicles broadcasts data, interference between the broadcasts may degrade the quality of the broadcasts and reduce the likelihood of successful communications between the vehicles. Thus, the above process 100 may be more reliable than broadcasts.

Figure 2:
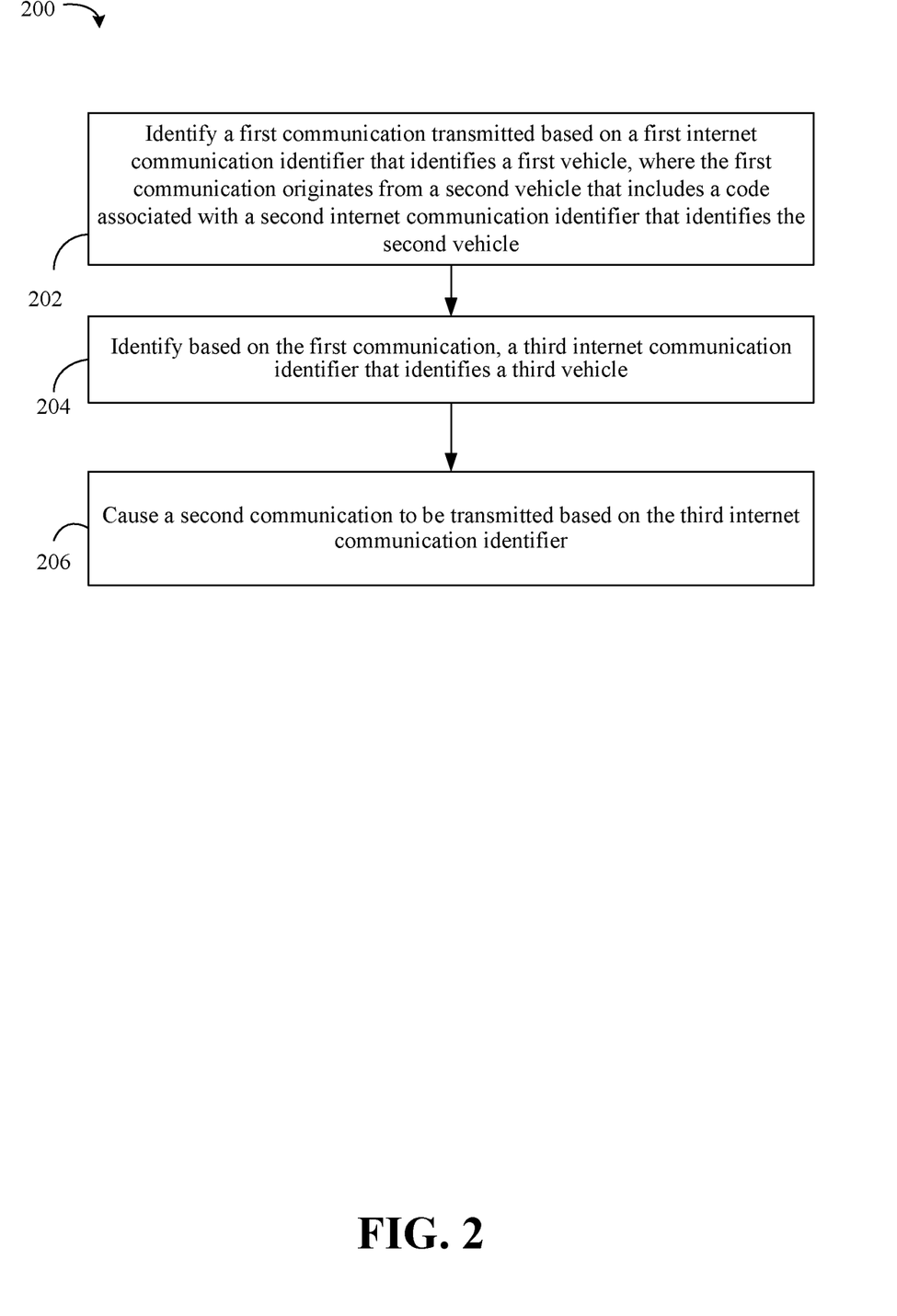
FIG. 2 is a flowchart of an example of a method of communicating between vehicles according to an embodiment.

FIG. 2 shows a method 200 of communicating between vehicles. The method 200 may generally be implemented in conjunction with any of the embodiments described herein, for example the process 100 of FIG. 1. In an embodiment, the method 200 is implemented in logic instructions (e.g., software), configurable logic, fixed-functionality hardware logic, circuitry, etc., or any combination thereof.

Illustrated processing block 202 identifies a first communication transmitted based on a first internet communication identifier that identifies a first vehicle. The first communication originates from a second vehicle that includes a code associated with a second internet communication identifier that identifies the second vehicle. Illustrated processing block 204 identifies based on the first communication, a third internet communication identifier that identifies a third vehicle. Illustrated processing block 206 causes a second communication to be transmitted based on the third internet communication identifier.

Figure 3:
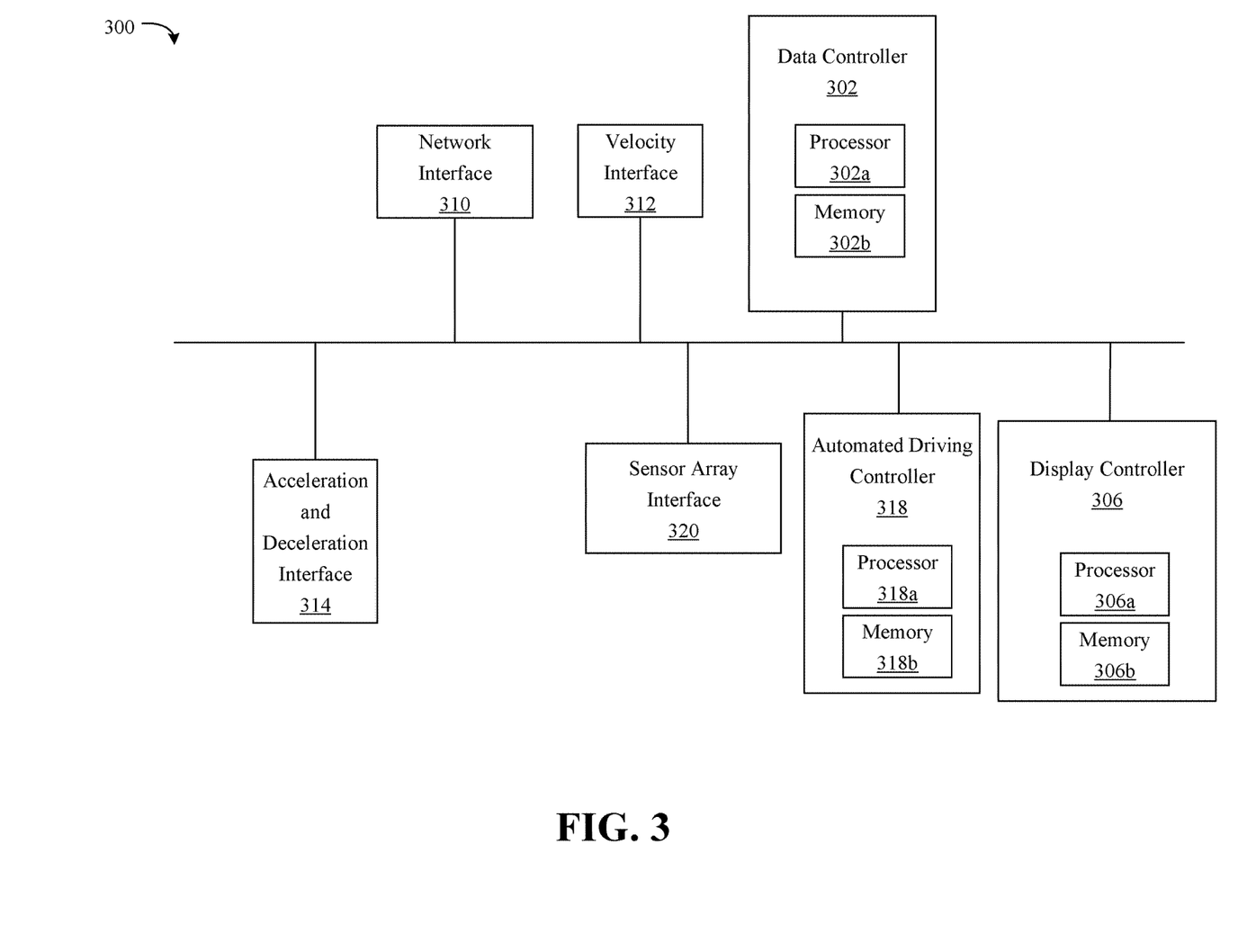
FIG. 3 is a block diagram of an example of a control system according to an embodiment.

FIG. 3 shows a more detailed example of a control system 300 (which may be referred to as a controller for brevity) of a vehicle to communicate with other vehicles. The illustrated control system 300 may be readily implemented in the first, second or third vehicles 110, 104, 102 to execute process 100 (FIG. 1) and may implement the method 200 (FIG. 2), already discussed.

In the illustrated example, the control system 300 may include a network interface 310. The network interface 310 may allow for communications between the vehicle and other vehicles to transmit messages over the internet to each other. The network interface 310 may further communicate with infrastructure. The network interface 310 may operate over various wireless communications. The control system 300 may include a velocity interface 312 to interface with various components of the vehicle to detect a velocity of the vehicle. The control system 300 may include an acceleration and deceleration interface 314 that interfaces with various components of the vehicle to detect an acceleration or deceleration of the vehicle. The control system 300 may include a sensor array interface 320 to interface with sensors of the vehicle to detect road conditions, objects on the roadway, codes of other vehicles, parameters of other vehicles and so forth.

The control system 300 may include a data controller 302 to control data that is to be transmitted to the other vehicles and/or the infrastructure. The data controller 302 may control the data based on various factors, such as user privacy settings, relevance of data (e.g., only relevant data is transmitted), whether a new vehicle code is detected and so forth.

The automated driving controller 318 may control driving parameters of the vehicle (e.g., acceleration, deceleration, velocity, position, etc.) based on other vehicle data from the other vehicles received by the network interface 310, data received from the infrastructure, sensor data from the sensor array interface 320. The automated driving controller 318 may execute a Cooperative Adaptive Cruise Control in coordination with the other vehicles and based on the other vehicle data. The display controller 306 may modify a display of the vehicle based on the other vehicle data, for example to display a message for a user of the vehicle based on the other vehicle data or the data from the infrastructure. In some embodiments, a warning may also be provided instead of or in addition to the above. For example, if a vehicle does not include an automated driving function, a warning may be provided to the user to notify them of actions of the other vehicles and based on the other vehicle data.

Additionally, the data controller 302 may include a processor 302a (e.g., embedded controller, central processing unit/CPU, circuitry, etc.) and a memory 302b (e.g., non-volatile memory/NVM and/or volatile memory) containing a set of instructions, which when executed by the processor 302a, cause the data controller 302 to control the data as described herein. Additionally, the automated driving controller 318 may include a processor 318a (e.g., embedded controller, central processing unit/CPU, circuitry, etc.) and a memory 318b (e.g., non-volatile memory/NVM and/or volatile memory) containing a set of instructions, which when executed by the processor 318a, cause the automated driving controller 318 to control automated driving as described herein. Further, the display controller 306 may include a processor 306a (e.g., embedded controller, central processing unit/CPU, circuitry, etc.) and a memory 306b (e.g., non-volatile memory/NVM and/or volatile memory) containing a set of instructions, which when executed by the processor 306a, cause the display controller 306 to control the display as described herein.

Figure 4:
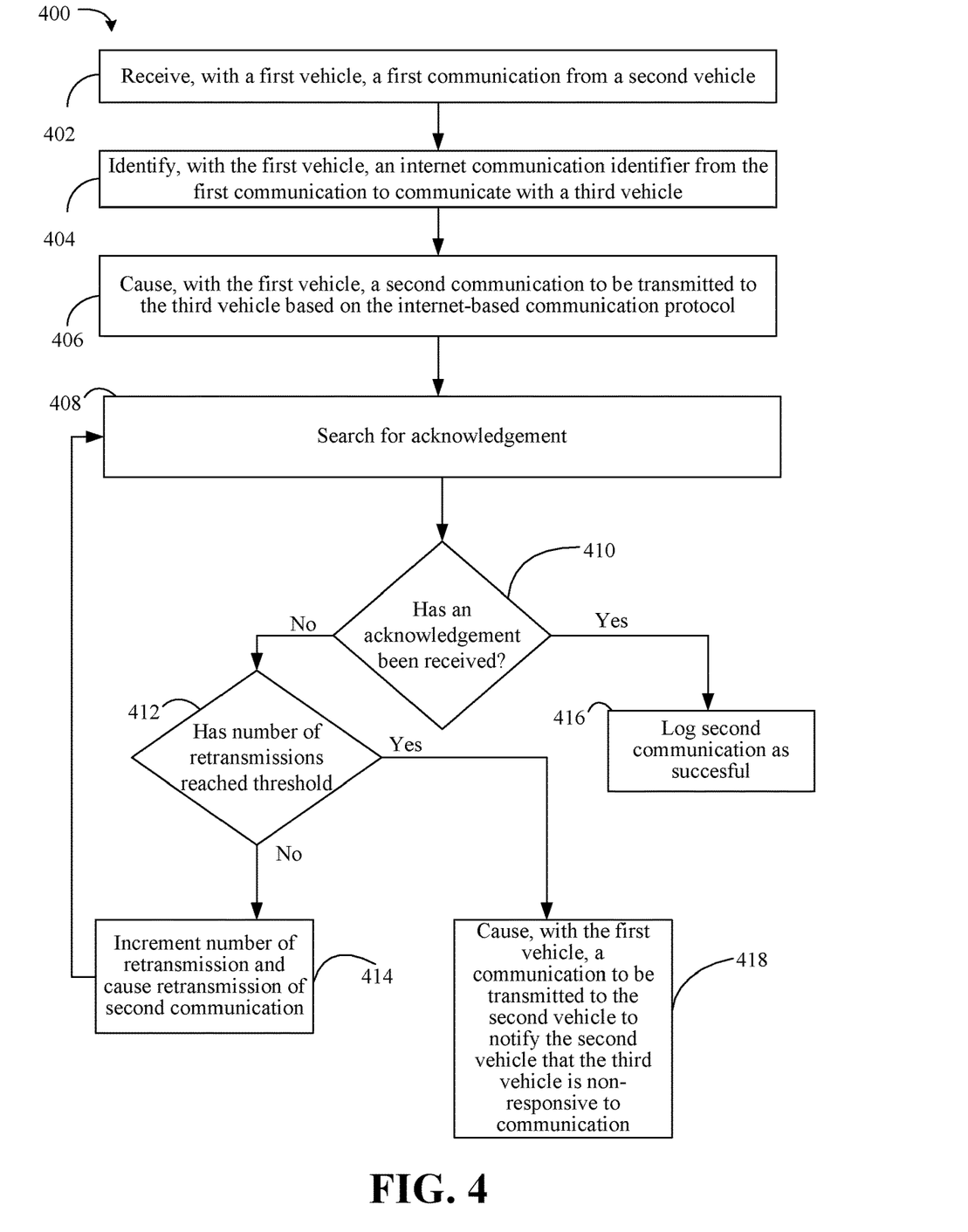
FIG. 4 is a flowchart of an example of a method of transmission control in a multi-vehicle network according to an embodiment.

FIG. 4 shows a method 400 of transmission control in a multi-vehicle network. The method 400 may generally be implemented in conjunction with any of the embodiments described herein. For example, the method 400 may be readily implemented in the first, second or third vehicles 110, 104, 102, process 100 of FIG. 1, the method 200 of FIG. 2 and the system 300 of FIG. 3. In an embodiment, the method 400 is implemented in logic instructions (e.g., software), configurable logic, fixed-functionality hardware logic, circuitry, etc., or any combination thereof.

Illustrated processing block 402 receives, with a first vehicle, a first communication from a second vehicle. Illustrated processing block 404 identifies, with the first vehicle, an internet communication identifier from the first communication to communicate with a third vehicle. The third vehicle may not be visible to the first vehicle. Illustrated processing block 406 causes, with the first vehicle, a second communication to be transmitted to the third vehicle based on the internet communication identifier. Illustrated processing block 408 searches for an acknowledgement with the first vehicle.

Illustrated processing block 410 determines whether an acknowledgement has been received. The first vehicle may execute illustrated processing block 410. If so, illustrated processing block 416 logs the second communication as successful. Thus, the first vehicle does not need to retransmit the second communication.

Otherwise, illustrated processing block 412 determines whether the number of retransmissions has reached a threshold. If so, illustrated processing block 418 causes, with the first vehicle, a communication to be transmitted to the second vehicle to notify the second vehicle that the third vehicle is non-responsive to communication. In some embodiments, in response the second vehicle may determine that the third vehicle is out of range or unable to receive communications and remove the third vehicle from further communications. For example, the second vehicle may omit transmitting the internet communication identifier of the third vehicle to other vehicles. In detail, the second vehicle may effectively remove the internet communication identifier of the third vehicle from the memory of the second vehicle since the internet communication identifier is invalid.

If the threshold has not been reached, illustrated processing block 414 increments a number of the retransmissions and causes retransmission of the second communication. In some embodiments, the retransmission may include updating one or more fields (e.g., current position, velocity) of the second communication. Thereafter, illustrated processing block 408 may search for an acknowledgement to the retransmission and the method 400 may continue as described above.

Thus, method 400 may verify that transmissions are received, and retransmissions may occur if receipt of initial transmission is not verified, to increase the probability of a successful transmission. If the transmission and retransmissions are not acknowledged, the method 400 may remove the internet communication identifier of the unresponsive vehicle to avoid wasting resources to send invalid data (e.g., the internet communication identifier) to other vehicles.

Figure 5:
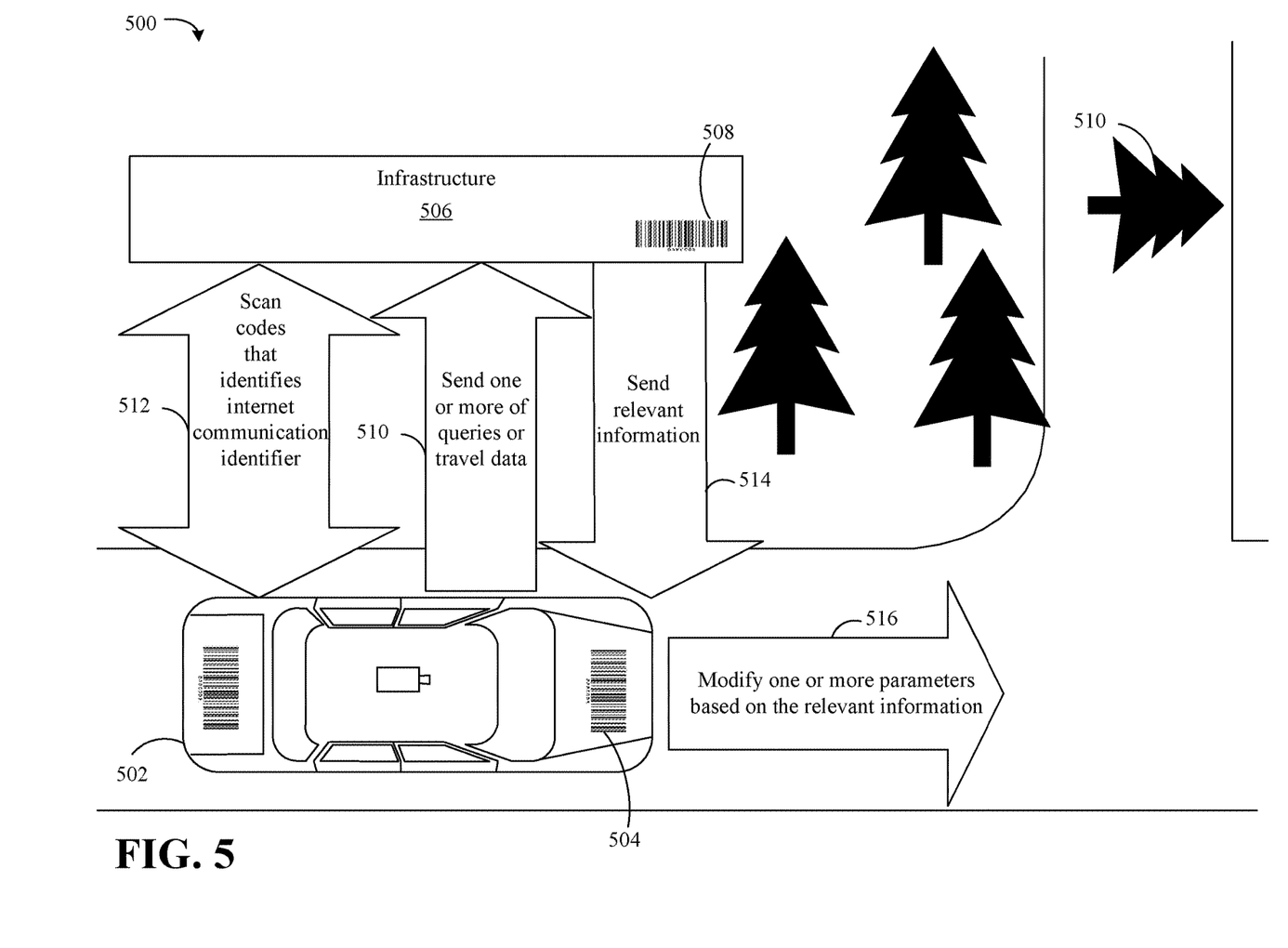
FIG. 5 is a diagram of an example of a message sharing process between a vehicle and infrastructure that is initiated by the vehicle according to an embodiment.

FIG. 5 illustrates a message sharing process 500 in which a vehicle 502 receives communications from infrastructure 506. It should be noted that similar components and processes to those as already described will be omitted for brevity. Further, it should be noted that the embodiments of FIG. 5 are combinable with any of the embodiments described herein. For example, the process 500 may be readily implemented in the first, second or third vehicles 110, 104, 102, the process 100 of FIG. 1, the method 200 of FIG. 2, the control system 300 of FIG. 3 and the method 400 of FIG. 4.

The vehicle 502 may be travelling through an area with limited internet connectivity (e.g., a mountain pass or city with large buildings). Thus, the vehicle 502 may be unable to connect to online resources for travel assistance (e.g., directions) with accuracy. For example, if the vehicle 502 is in a city environment, an urban canyon effect may occur where the vehicle 502 is unable to receive accurate global positioning system coordinates due to shadowing and multipath effects. If the vehicle 502 is in a mountain area, the vehicle 502 may be in a cellular dead zone and unable to connect to the internet.

The infrastructure 506 may be positioned so as to be proximate the roadway (e.g., part of a road sign). The infrastructure 506 may include components (e.g., long range antenna, satellite communications) that are able to connect to the internet. Thus, the infrastructure 506 may act as an intermediary between the internet and the vehicle 502 in some embodiments. In some embodiments however, the infrastructure 506 may receive updates to local driving conditions from other vehicles. In such embodiments, the infrastructure 506 may not necessarily be connected to the internet in order to provide relevant information.

Process 500 may include scanning codes 504, 508 that identify internet communication identifiers 512. For example, the vehicle 502 may scan the code 508 of the infrastructure 506 to enable communication with the infrastructure 506. In some embodiments, the code 508 may also include to a wireless interface protocol (e.g., Bluetooth pairing information, Wi-Fi information, short range radio details, etc.) to be utilized to communicate with the infrastructure 508. In some embodiments, the infrastructure 506 may scan the code 504 to identify a wireless interface protocol to transmit data to the vehicle 502 similarly to as described above. In some embodiments, only one of the codes 504, 508 may be scanned to establish communication. For example, the vehicle 502 may scan the code 508 and transmit a communication to the infrastructure 506 with any details needed to establish communication between the infrastructure 506 and the vehicle 502.

The process 500 may include sending or more queries of travel data 510 to the infrastructure 506. For example, the vehicle 502 may request navigation directions or updates from the infrastructure 506. In some embodiments, the vehicle 501 may request directions to a particular location. The infrastructure 506 may determine a reply to the one or more queries, which may be sent as relevant information 514. For example, the infrastructure 506 may determine the navigation directions by one or more of accessing the internet, accessing locally stored maps, analyzing senor data of sensors connected to or a part of the infrastructure 506 or analyzing data transmitted from other vehicles.

In the present example, the infrastructure 506 may identify that an obstacle 510 is on the roadway. For example, the infrastructure 506 may identify the obstacle 510 from data provided from other vehicles that sensed the obstacle 510, a notification on the internet that the obstacle 510 exists. In some embodiments, the infrastructure 506 may include sensors that image and/or sensed the obstacle 510 as sensor data and access the sensor data to identify the obstacle 510. In some embodiments the infrastructure 506 may access a locally stored map that identifies the obstacle 510.

Thus, the relevant information may include a notification of the obstacle 510, and a suggestion to reroute to exit the roadway. The vehicle 502 may automatically reroute the vehicle 502 (e.g., autonomous driving modification) and/or notify a driver of the vehicle 502 about the obstacle 510 as well as the received notification and suggestion. Thus, the vehicle 502 may modify one or more parameters 516 (e.g., display parameters or driving parameters such as velocity, navigation directions, etc.) based on the relevant information to reroute to exit the highway.

Figure 6:
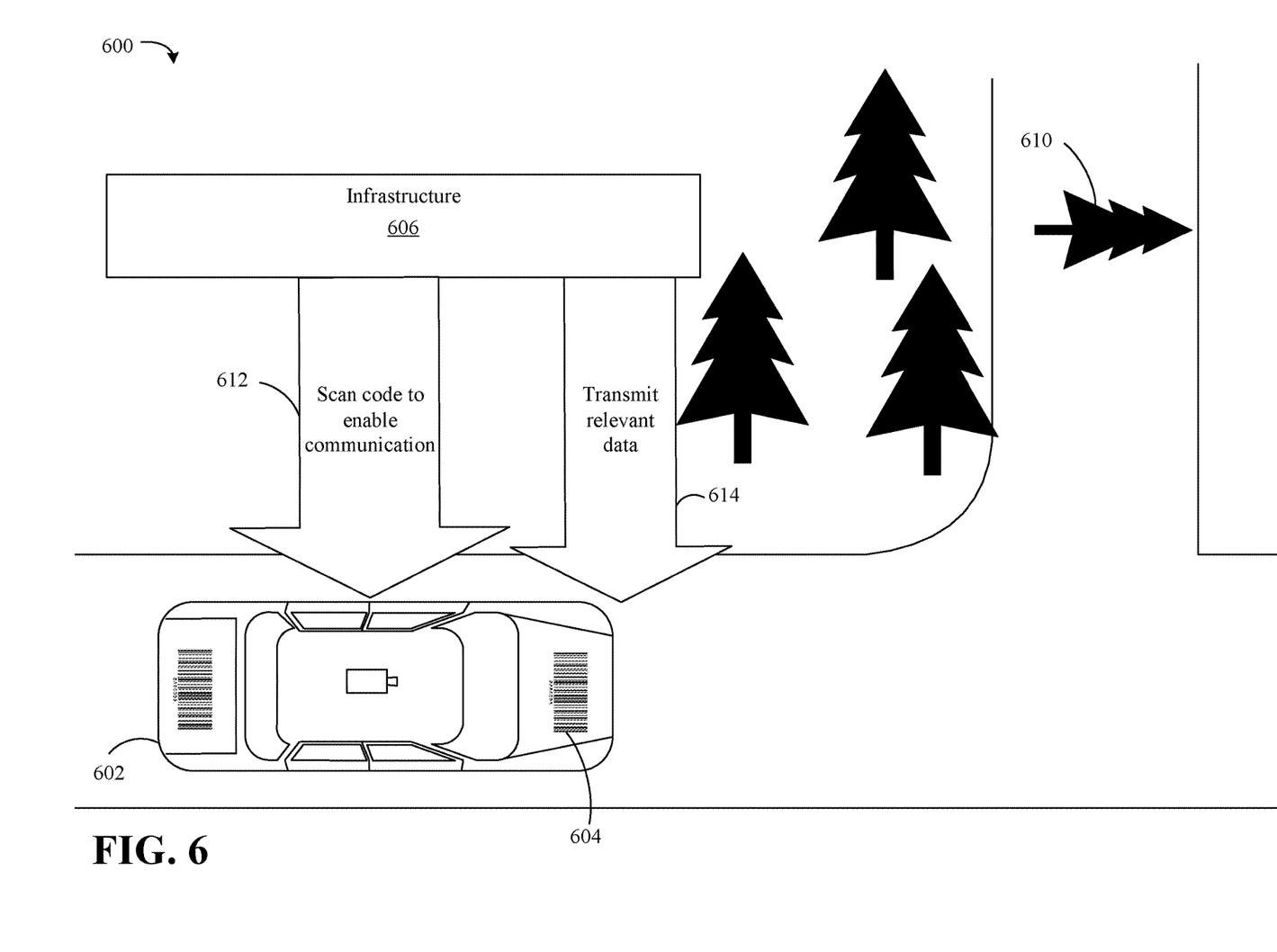
FIG. 6 is a diagram of an example of a proactive message sharing process between a vehicle and infrastructure that is initiated by the infrastructure according to an embodiment.

FIG. 6 illustrates a message sharing process 600 in which a vehicle 602 receives communications from infrastructure 606 proactively rather than in response to a particular request. It should be noted that similar components and processes to those as already described will be omitted for brevity. Further, it should be noted that the embodiments of FIG. 6 are combinable with any of the embodiments described herein. For example, the process 600 may be readily implemented in the first, second or third vehicles 110, 104, 102, the process 100 of FIG. 1, the method 200 of FIG. 2, the control system 300 of FIG. 3, the method 400 of FIG. 4 and/or the process 500 of FIG. 5.

The vehicle 602 may be travelling in a roadway. In some embodiments, the vehicle 602 may travelling through an area with limited internet connectivity (e.g., a mountain pass or city with large buildings). Thus, the vehicle 602 may be unable to connect to online resources for travel assistance (e.g., directions and/or weather updates).

The infrastructure 606 may be positioned so as to be proximate the roadway. The infrastructure 606 may include components (e.g., long range antenna, satellite communications) that are able to connect to the internet and/or receive travel related updates. In some embodiments, the infrastructure 606 may part of a road sign for example.

Process 600 may include scanning a code 604 to enable communication 612. For example, the infrastructure 606 may scan the code 604 to determine an internet communication identifier that identifies the vehicle 602 to establish communication with the vehicle 602.

The infrastructure 606 may determine relevant information that is relevant for the vehicle 602. For example, the infrastructure 606 may determine the relevant data by one or more of accessing the internet, accessing locally stored maps, analyzing senor data of sensors connected to or a part of the infrastructure 606 or analyzing data transmitted from other vehicles.

For example, the infrastructure 606 may determine current road conditions, weather forecasts, and information (e.g., a position, a size, etc.) associated with obstacle 610 may be included as part of the relevant data. The relevant data may include other travel associated data, such as alerts to accidents, roadway cleanups, traffic jams, fuel locations, a position of the vehicle 602, a position of the infrastructure 604, food locations, directions to nearest landmarks and/or city etc. Thus, process 600 may send the relevant data 614 to the vehicle 602 based on the internet communication identifier. Thus, the infrastructure 604 may provide data to the vehicle 602 prior to receive a request.

Figure 7:
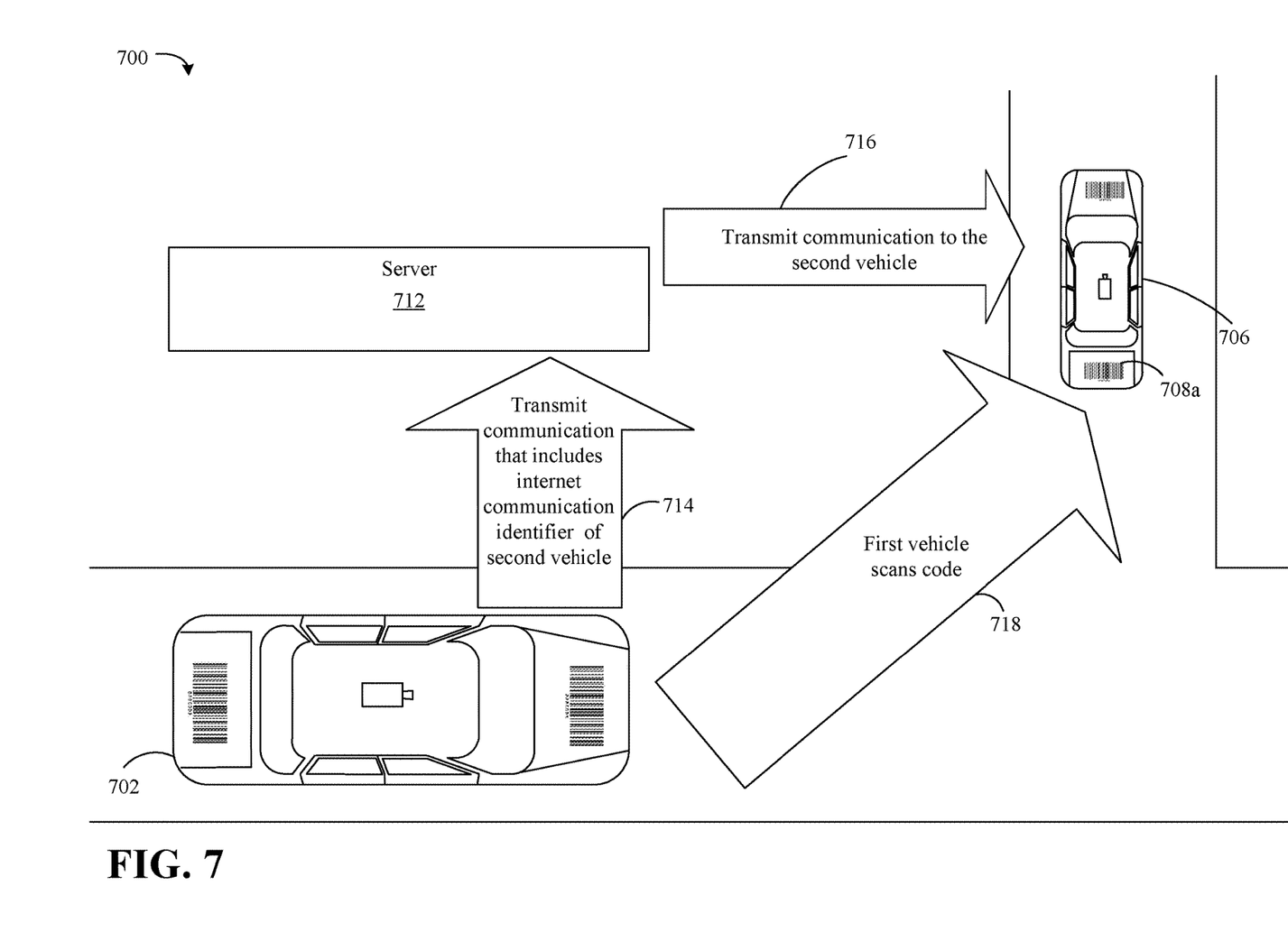
FIG. 7 is a diagram of an example of vehicles that communicate through a server according to an embodiment.

FIG. 7 illustrates a message sharing process 700 in which a server (e.g., a computing device) translates an internet communication identifier into a transmission destination for a vehicle. It should be noted that similar components and processes to those as already described will be omitted for brevity. Further, it should be noted that the embodiments of FIG. 7 are combinable with any of the embodiments described herein. For example, the method 700 may be readily implemented in the first, second or third vehicles 110, 104, 102, the process 100 of FIG. 1, the method 200 of FIG. 2, the control system 300 of FIG. 3, the method 400 of FIG. 4, the process 500 of FIG. 5 and/or the process 600 of FIG. 6.

A first vehicle 702 may be travelling on a roadway. The first vehicle 702 may be in communication with a remote computing device, such as the server 712. For example, the first vehicle 702 may be connected to the server 712 through the internet. Similarly, a second vehicle 706 may be in communication with the server 712.

Process 700 may include the first vehicle 702 scanning a code 708a of the second vehicle 706 that corresponds to an internet communication identifier that identifies the second vehicle 706. As already described, first vehicle 702 may decode the code to identify the internet communication identifier of the second vehicle 706. The first vehicle 702 may determine that data (e.g., driving updates, velocity, newly acquired sensor data, etc.) is to be transmitted to the second vehicle 706. Thus, the first vehicle 702 may transmit a communication that includes the internet communication identifier of the second vehicle 706, 714 to the server 712.

The server 712 may forward the communication to the second vehicle 706. In some embodiments, the server 712 may identify the internet communication identifier from the communication transmitted by the first vehicle 702. The server 712 may then determine a final destination for the communication based on the internet communication identifier. For example, the server 712 may include a lookup table (or other data structure and/or algorithm) that relates internet communication identifiers to final IP addresses for example. The server 712 may access the lookup table based on the internet communication identifier and identify a final IP address that is associated with the internet communication identifier. The server 712 may then transmit the communication to the second vehicle 706 based on the final IP address. The final IP address may belong to the second vehicle 706, and thus the communication may be transmitted according to the final IP address. In some embodiments, the internet communication identifier may include the final IP address, in which case the server 712 may utilize the final IP address included in the internet communication identifier. While IP addresses are discussed above, it will be understood that any addressing system or protocol may be used.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A first vehicle associated with a first communication identifier, the first vehicle including:
   one or more sensors to identify sensor data associated with a second vehicle by scanning a second code physically provided at the second vehicle, wherein the second vehicle includes the second code associated with a second communication identifier that identifies the second vehicle, the second code being different from a first code associated with the first communication identifier of the first vehicle;
   a network interface that receives a first communication, wherein the first communication is transmitted based on the first communication identifier and originates from the second vehicle; and
   a control system including at least one processor and at least one memory having a set of instructions, which when executed by the at least one processor, cause the control system to:
      identify based on the first communication, a third communication identifier that identifies a third vehicle, and
      cause a second communication to be transmitted based on the third communication identifier.

2. The first vehicle of claim 1, wherein the second communication includes one or more driving factors associated with the first vehicle.

3. The first vehicle of claim 1, wherein the instructions of the at least one memory, when executed, cause the control system to:
   cause the second communication to be transmitted to the third vehicle over an internet.

4. The first vehicle of claim 1, wherein the instructions of the at least one memory, when executed, cause the control system to:
   identify whether a first acknowledgement is received, wherein the first acknowledgement includes an identification that the third vehicle received the second communication; and
   in response to the first acknowledgement not being received, cause a retransmission of the second communication based on the third communication identifier.

5. The first vehicle of claim 4, wherein the instructions of the at least one memory, when executed, cause the control system to:
   identify the second code from the sensor data;
   identify the second communication identifier from the second code;
   identify whether a second acknowledgement is received from the third vehicle, wherein the second acknowledgement includes an identification that the third vehicle received the second communication that was retransmitted; and
   in response to the second acknowledgement not being received, cause a third communication to be transmitted based on the second communication identifier so that the third communication is transmitted to the second vehicle, wherein the third communication includes a notification that the third vehicle is non-responsive to communication.

6. The first vehicle of claim 1, wherein the second communication is to include an identification of one or more of an obstacle or a road condition.

7. The first vehicle of claim 1, wherein the instructions of the at least one memory, when executed, cause the control system to:
   cause the second communication to be transmitted to a remote computing device that is to relay the second communication to the third vehicle, wherein the second communication includes the third communication identifier.

8. At least one non-transitory computer readable storage medium comprising a set of instructions, which when executed by a control system of a first vehicle, cause the control system to:

identify a first communication transmitted based on a first communication identifier that is associated with the first vehicle, wherein the first communication originates from a second vehicle that includes a code associated with a second communication identifier that identifies the second vehicle;

identify based on the first communication, a third communication identifier that identifies a third vehicle;

cause a second communication to be transmitted based on the third communication identifier, identify the code from sensor data obtained by the first vehicle by scanning the code that is physically provided at the second vehicle; and identify the second communication identifier from the code.

9. The at least one non-transitory computer readable storage medium of claim 8, wherein the second communication includes one or more driving factors associated with the first vehicle.

10. The at least one non-transitory computer readable storage medium of claim 8, wherein the instructions, when executed, cause the control system to:

cause the second communication to be transmitted to the third vehicle over an internet.

11. The at least one non-transitory computer readable storage medium of claim 8, wherein the instructions, when executed, cause the control system to:

identify whether a first acknowledgement is received, wherein the first acknowledgement includes an identification that the third vehicle received the second communication; and in response to the first acknowledgement not being received, cause a retransmission of the second communication based on the third communication identifier.

12. The at least one non-transitory computer readable storage medium of claim 11, wherein the instructions, when executed, cause the control system to:

identify whether a second acknowledgement is received from the third vehicle, wherein the second acknowledgement includes an identification that the third vehicle received the second communication that was retransmitted; and in response to the second acknowledgement not being received, cause a third communication to be transmitted based on the second communication identifier so that the third communication is transmitted to the second vehicle, wherein the third communication includes a notification that the third vehicle is non-responsive to communication.

13. The at least one non-transitory computer readable storage medium of claim 8, wherein the second communication includes an identification of one or more of an obstacle or a road condition.

14. The at least one non-transitory computer readable storage medium of claim 8, wherein the instructions, when executed, cause the control system to:

cause the second communication to be transmitted to a remote computing device that is to relay the second communication to the third vehicle, wherein the second communication includes the third communication identifier.

15. A method of communication associated with a first vehicle, the method comprising:

identifying a first communication transmitted based on a first communication identifier that identifies the first vehicle, wherein the first communication originates from a second vehicle that includes a code associated with a second communication identifier that identifies the second vehicle;

identifying based on the first communication, a third communication identifier that identifies a third vehicle;

causing a second communication to be transmitted based on the third communication identifier;

identifying the code from sensor data obtained by the first vehicle by scanning the code that is physically provided at the second vehicle; and identifying the second communication identifier from the code.

16. The method of claim 15, wherein the second communication includes one or more driving factors associated with the first vehicle.

17. The method of claim 15, further comprising:

causing the second communication to be transmitted to the third vehicle over an internet.

18. The method of claim 15, further comprising:

identifying whether a first acknowledgement is received, wherein the first acknowledgement includes an identification that the third vehicle received the second communication; and in response to the first acknowledgement not being received, causing a retransmission of the second communication based on the third communication identifier.

19. The method of claim 18, further comprising:

identifying whether a second acknowledgement is received from the third vehicle, wherein the second acknowledgement includes an identification that the third vehicle received the second communication that was retransmitted; and in response to the second acknowledgement not being received, causing a third communication to be transmitted based on the second communication identifier so that the third communication is transmitted to the second vehicle, wherein the third communication includes a notification that the third vehicle is non-responsive to communication.

20. The method of claim 15, wherein the second communication includes an identification of one or more of an obstacle or a road condition.

* * * * *